(12) United States Patent  
Grob-Lipski (10) Patent No.: US 8,121,081 B2  
(45) Date of Patent: Feb. 21, 2012

(54) METHOD AND APPARATUS SIGNALING RESOURCE ALLOCATION

(75) Inventor: Heidrun Grob-Lipski, Starzach (DE)

(73) Assignee: Alcatel Lucent, Paris (FR)

( * ) Notice: Subject to any disclaimer, the term of this patent is extended or adjusted under 35 U.S.C. 154(b) by 777 days.

(21) Appl. No.: 12/177,500

(22) Filed: Jul. 22, 2008

(65) Prior Publication Data

US 2009/0029711 A1    Jan. 29, 2009

(30) Foreign Application Priority Data

Jul. 23, 2007    (EP) ..................................... 07290921

(51) Int. Cl.  
    *H04Q 7/00*        (2006.01)
(52) U.S. Cl. ......... 370/329; 370/344; 370/480; 455/450
(58) Field of Classification Search .................. 370/203, 370/208, 209, 328–338, 343–349, 442–444, 370/478, 480, 498; 455/450–452.2
See application file for complete search history.

(56) References Cited

U.S. PATENT DOCUMENTS

| | | | |
|---|---|---|---|
| 6,819,930 B1 | 11/2004 | Laroia | |
| 7,839,822 B2 * | 11/2010 | Yang et al. | ..................... 370/329 |
| 2003/0058923 A1 | 3/2003 | Chen | |
| 2007/0053320 A1 * | 3/2007 | Rinne et al. | .................... 370/329 |
| 2007/0242636 A1 * | 10/2007 | Kashima et al. | .............. 370/329 |
| 2008/0192847 A1 * | 8/2008 | Classon et al. | ................ 375/260 |

FOREIGN PATENT DOCUMENTS

GB            2434279 A      7/2007

* cited by examiner

*Primary Examiner* — Pao Sinkantarakorn  
(74) *Attorney, Agent, or Firm* — Fay Sharpe LLP (57) ABSTRACT

A method of signaling to a mobile terminal the radio resources that will be used in a wireless communication between the mobile terminal and a base station is described. The base station provides a plurality of radio resources. The method comprises the steps:
- splitting the plurality of radio resources into a set of partitions (124, 126), wherein each partition of the set of partitions comprises a set of virtual blocks (128, . . . , 138), wherein each virtual block of the set of virtual blocks is exclusively mapped to one or more radio resources of the plurality of radio resources;
- using an identification format (144) according to which a collection of one or more virtual blocks of the set of virtual blocks is identifiable;
- allocating at least a first virtual block (130, 132) for communication between the mobile terminal and the base station, first block identifier the at least first virtual block being identifiable by a first specification (146) according to the identification format;
- sending first block identifier the first specification to the mobile terminal.

5 Claims, 6 Drawing Sheets

METHOD AND APPARATUS SIGNALING RESOURCE ALLOCATION

FIELD OF THE INVENTION

The invention relates to a method of signaling to a mobile terminal the radio resources that will be used in a wireless communication between the mobile terminal and the base station, to a computer program product comprising computer executable instructions to perform the method in accordance with the invention, and to a communication network comprising means for performing the method in accordance with the invention.

BACKGROUND

In frequency division multiplexing (FDM), a method that is frequently employed by for example wireless communication systems, multiple signals are sent out at the same time, but in different frequencies. In OFDM, a single transmitter transmits on many (typically dozens to thousands) different orthogonal frequencies. These frequencies are also referred to as sub-carriers, the totality of available sub-carriers forming an OFDM spectrum.

The sub-carriers can be regarded as radio resources that are used in FDM systems for transmission of data between a base station and the mobile terminals served by the base station. In that sense, the FDM spectrum can be regarded as a plurality of radio resources of which some will be selected out for communication with a particular mobile terminal. As another example, the plurality of radio resources relate to a plurality of codes is in code division multiplexing (CDMA).

A (geographical) transmission area for transmission of the radio resources is sub-divided into a number of transmission cells, wherein each of them being served by a respective base station or node B. Mobile terminals, e.g. user equipments or mobile stations, present inside the transmission cells are allocated resources, i.e. radio resources, for communication inside the transmission system. The allocation of the radio resources is controlled by the base station. The allocation of the resources has to be signaled to each mobile terminal.

It is an object of the invention to provide an alternative method of signaling to a mobile terminal the radio resources that will be used in a wireless communication between the mobile terminal and the base station serving the mobile terminal.

SUMMARY OF THE INVENTION

According to a first aspect of the invention, there is provided a method of signaling to a mobile terminal the radio resources that will be used in a wireless communication between the mobile terminal and a base station. The base station is the serving base station with respect to the mobile terminal. In accordance with an embodiment of the invention, the base station provides a plurality of radio resources. According to a step of the method in accordance with the invention, the plurality of radio resources is split into a set of partitions, wherein each partition of the set of partitions comprises a set of virtual blocks. Each virtual block of the set of virtual blocks is exclusively mapped to one or more radio resources of the plurality of radio resources. Then, an identification format according to which a collection of one or more virtual blocks of the set of virtual blocks is identifiable is employed. Furthermore, at least a first virtual block is allocated for communication between the mobile terminal and the base station. The at least first virtual block is identifiable by a first specification according to the identification format. According to a further step in accordance with the method, the first specification is sent to the mobile terminal.

In accordance with an embodiment of the invention, a block identifier is assigned to each partition of the set of partitions. The at least first virtual block is comprised in a first partition of the set of partitions and the first partition is associated with a first block identifier, wherein the first block identifier is sent to the mobile terminal.

Thus, the available plurality of radio resources is split into a set of partitions and each partition is split into a set of virtual blocks. Each virtual block or collection of one or more virtual blocks in a partition is identifiable according to a pre-given identification format. The at least first virtual block employed for communication between the mobile terminal and the base station is thus identified by a first specification and the first block identifier specifies the first partition to which the at least first virtual block belongs.

The first block identifier and the first specification are then sent, for example in a message, to the mobile terminal.

The use of an identification format is particularly advantageous as the virtual blocks in the set of virtual blocks can be identified simply by a first specification which can be expressed in form of a number. Similarly, the first block identifier can be expressed by a number. This provides the advantage that the signaling of the radio resources relating to the at least first virtual block that will be used for communication with the mobile terminal by the base station can be done with relative low overhead as according to this embodiment of the invention only the first block identifier and the first specification have to be transmitted to the mobile terminal.

In accordance with an embodiment of the invention, direct signaling is employed in order to send the first block identifier and bitmap signaling is employed to send the first specification to the mobile terminal. This means that the first block identifier is given by a first sequence of bits and the first specification is given by another sequence of bits or a plurality of sequences of bits. All bit sequences will be in particular due to the usage of an identification format relatively short. This provides the advantage that the number of bits employed for signaling that the at least first virtual block of the first partition is employed for communication with the mobile terminal can be kept relatively small and thus resources of the base station can be saved.

In accordance with an embodiment of the invention, the mobile terminal is adapted to determine the at least first virtual block specified in accordance with the identification format and to use the radio resources associated with the at least first virtual block for communication with the base station. Thus, the identification format must be known to the mobile terminal in advance so that the mobile terminal is able to use the first specification and the first block identifier in order to determine that the at least first virtual block will be employed for communication between the base station and the mobile terminal. Moreover, the mobile terminal is then enabled to use the radio resources that relate to the at least first virtual block for uplink communication with the base station.

In accordance with an embodiment of the invention, a timing indication is sent to the mobile terminal. The timing indication specifies for how many time transmission intervals the first partition and the at least first virtual block will be employed for communication with the mobile terminal.

In accordance with an embodiment of the invention, consecutive block numbers are assigned according to the identification format to at least a portion of the set of virtual blocks of the first partition. The at least first virtual block relates to a total number of virtual blocks having consecutive block numbers assigned and the first specification comprises the lowest block number assigned to the virtual blocks of the number of blocks and the total number of virtual blocks.

In accordance with an embodiment of the invention, the total number of virtual blocks lies in the range between 1 and the maximum number of virtual blocks that can be allocated for the mobile terminal per time transmission interval.

In accordance with an embodiment of the invention, the identification format follows a tree approach for specifying the at least first virtual block.

In accordance with an embodiment of the invention, the identification format employs a Pascal's triangle in order to specify the at least first virtual block.

In accordance with an embodiment of the invention, the set of virtual blocks of a partition comprises a set of distributed virtual resource blocks (D-VRBs) and a set of localized virtual resource blocks (L-VRBs). The at least first virtual block relates to one or more D-VRBs of the set of D-VRBs and/or one or more L-VRBs of the set of L-VRBs. The first specification allows to identify the one or more D-VRBs and/or one or more L-VRBs relating to the first virtual block.

In accordance with an embodiment of the invention, the sizes of the distributed virtual resource blocks are adaptable. In particular, the allocation of the virtual resource blocks is carried out by a scheduler which is a component of the base station. Since the sizes of the D-VRBs are adaptable and may vary from one time transmission interval to the next, they provide some flexibility for the scheduler, in particular when the radio resources of the plurality of radio resources that are associated with the virtual resource blocks have to be allocated for a large amount of mobile terminals.

In accordance with an embodiment of the invention, the partitions of the set of partitions are equally sized. Thus, all partitions comprise the same, non-overlapping amount of radio resources.

In accordance with an embodiment of the invention, an indicator which indicates which identification format is employed for describing the virtual blocks. The indicator thus specifies whether direct signaling, bitmap signaling or a tree approach is employed for describing and identifying the virtual blocks. The identification format could for example be selected by an algorithm such that the lowest signaling overhead is required for signaling which radio resources have been allocated for a mobile terminal.

In accordance with an embodiment of the invention, an indicator which indicates distributed or localized transmission with respect to the at least first virtual block is further sent to the mobile terminal. Thus, the allocation of a distributed or localized virtual resource block is signaled to the mobile terminal by use of the indicator.

In accordance with an embodiment of the invention, the radio resources relate to sub-carriers and the plurality of radio resources relates to an OFDM spectrum.

According to a second aspect of the invention, there is provided a computer program product for signaling to a mobile terminal the radio resources that will be used in a wireless communication between the mobile terminal and a base station which serves the mobile terminal, wherein the base station provides a plurality of radio resources and wherein the computer program product comprises a computer usable medium including a computer readable program, wherein the computer readable program when executed on a computer causes the computer to perform steps according to the method in accordance with the invention.

According to a third aspect of the invention, there is provided a communication network. In accordance with an embodiment of the invention, the network comprises a base station which provides a plurality of radio resources and a mobile terminal. The communication network further has means for splitting the plurality of radio resources into a set of partitions, wherein each partition comprises a set of virtual blocks and wherein each virtual block of the set of virtual blocks is exclusively mapped to one or more radio resources of the plurality of radio resources. The communication network further has means for assigning a block identifier to each partition of the set of partitions and means for using an identification format according to which a collection of one or more virtual blocks of the set of virtual blocks of a partition is identifiable. The communication network further comprises means for allocating at least a first virtual block of a first partition of the set of partitions for communication between the mobile terminal and the base station, wherein the first partition is associated with a first block identifier and wherein the at least first virtual block is identifiable by a first specification according to the identification format. The communication network further comprises means for sending the first block identifier and the first specification to the mobile terminal.

According to a fourth aspect, there is provided a communication network component comprising:
  means for splitting a plurality of radio resources of a base station into a set of partitions, wherein each partition of the set of partitions comprises a set of virtual blocks, each virtual block of the set of virtual blocks is exclusively mapped to one or more radio resources of the plurality of radio resources;
  means for using an identification format according to which a collection of one or more virtual blocks of the set of virtual blocks is identifiable;
  means for allocating at least a first virtual block for communication between a mobile terminal and the base station, the at least first virtual block being identifiable by a first specification according to the identification format, the base station serving the mobile terminal;
  means for sending the first specification to the mobile terminal.

BRIEF DESCRIPTION OF THE DRAWINGS

In the following embodiments of the invention will be described in greater detail by way of example only making reference to the drawings in which.

DETAILED DESCRIPTION

Figure 1:
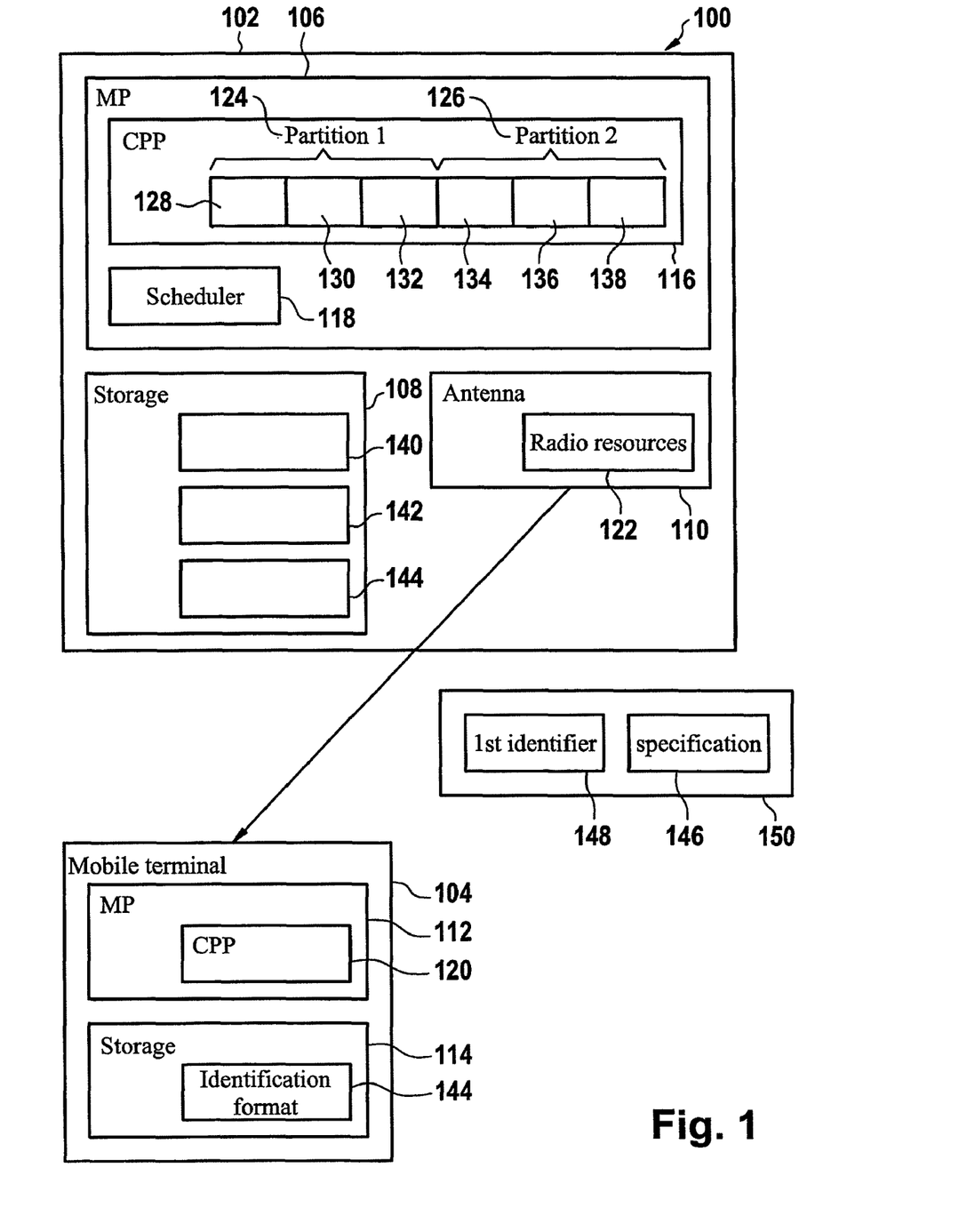
FIG. 1 shows a schematic block diagram of a wireless communication network.

FIG. 1 shows a schematic block diagram of a wireless communication network 100. The communication network 100 comprises a base station 102 and a mobile terminal 104. The base station 102 comprises a microprocessor 106, storage 108, and an antenna 110. The mobile terminal 104 comprises a microprocessor 112 and storage 114.

The microprocessor 106 executes a computer program product 116 and a scheduler 118 that are both stored on the storage 108 and loaded for execution into the microprocessor 106. The microprocessor 112 of the mobile terminal 104 executes a computer program product 120 that is stored on the storage 114 and loaded for execution into the microprocessor 112.

The antenna 110 is employed for establishing a radio connection to the mobile terminal 104 and therefore provides a plurality of radio resources 122. The plurality of radio resources 122 might relate to a band of sub-carriers that are orthogonal with respect to each other and that can be employed as carriers to transmit information to the mobile terminal 104 by use of OFDM techniques. The plurality of radio resources 122 might alternatively relate to a plurality of codes that can be employed to transmit information to the mobile terminal 104 by use of code division multiple access (CDMA) techniques.

For communication with the mobile terminal 104, not all radio resources of the plurality of radio resources 122 will be employed. In particular, a selection of radio resources of the plurality of radio resources 122 will be allocated for communication with the mobile terminal 104.

The computer program product 116 is adapted to split logically the plurality of radio resources 122 into a set of partitions. The set of partitions consists according to the example illustrated with reference to FIG. 1 of a first partition 124 and a second partition 126. Furthermore, the computer program product splits each partition into a set of virtual blocks. The first partition 124 comprises the virtual blocks 128, 130, and 132. The second partition 126 comprises virtual blocks 134, 136, and 138. Each virtual block relates to a selection of radio resources of the plurality of radio resources, wherein the radio resources are uniquely comprised in the corresponding virtual block. Thus, a real radio resource comprised in the virtual block 128 will not be included in one of the other virtual blocks 130 to 138.

The computer program product 116 is further adapted to assign a first block identifier 140 to the first partition 124 and a second block identifier 142 to the second partition 126. The first and second identifiers 140, 142 allow according to a pregiven identification format 144 to identify the first and second partitions 124 and 126. The identification format 144 is stored in machine-readable form in the storage 144 so that it is accessible for the microprocessor 106. The identification format 144 might be provided by the manufacturer of the base station or by the manufacturer of the parts of the base station that take care of allocation and signaling radio resources to mobile stations served by the base station.

The scheduler 118 is then able to allocate one or more of the virtual blocks of one or more partitions for communication with the mobile terminal 104. For example, the scheduler 118 might allocate the virtual blocks 130 and 132 of the first partition 124 for communication with the mobile terminal 104. The identification format 142 provides a possibility that allows to identify the virtual blocks 130 and 132 by use of a specification 146.

According to an example of the identification format 142, consecutive numbers are assigned to each virtual block of a partition. Thus, number '1' is assigned to the virtual block 128, number '2' is assigned to the virtual block 130, and number '3' is assigned to the virtual block 132. The above mentioned specification 146 then comprises the numbers '2' and '3' for identifying the virtual blocks 130 and 132.

According to another example of the identification format 142, consecutive numbers are assigned to each virtual block of a partition. Thus, number '1' is assigned to the virtual block 128, number '2' is assigned to the virtual block 130, and number '3' is assigned to the virtual block 132. The above mentioned specification 146 then comprises the number '2' and an indication that the block following to virtual block 130 is allocated for the mobile terminal 104.

A first identifier 148 that equals the first block identifier 124 and the specification 146 is then sent in a message 150 to the mobile terminal 102 before the actual virtual blocks identifiable by use of the first identifier 148 and the specification 146 are used in the communication between the mobile terminal 104 and the base station 102.

The mobile terminal 104 comprises an antenna (not shown in FIG. 1) for receiving the message 150. The computer program product 120 is then able to extract the first identifier 148 and the specification 150 from the message 150 and to determine the actual virtual blocks corresponding to the first identifier 148 and the specification 146 by use of the identification format 144 which is known to the mobile terminal as a copy of it is stored on the storage 114. The mobile terminal 104 is then able to use the virtual blocks allocated for the mobile terminal in uplink and downlink communications with the base station 102.

The first identifier 148 and the specification 146 can be sent to the mobile terminal 104 in form of two bit sequences. As the first identifier 148 and the specification 146 relate to simple numbers, the lengths of the two bit sequences are relatively short. The method in accordance with the invention is therefore particularly advantageous as relative few resources of the base station must be used and reserved for the transmission of the message 150.

The functionality of splitting the plurality of radio resources 122 into partitions and virtual blocks and of allocating virtual blocks for the mobile terminal 104 has been split according to the example described above between the computer program product 116 and the scheduler 118. It is therefore evident to the skilled person that those functionalities can be provided by two different components of the base station 102. It is however also evident to the skilled person that both functionalities could by provided by a single computer program and/or by a single component of the base station 102.

Figure 2:
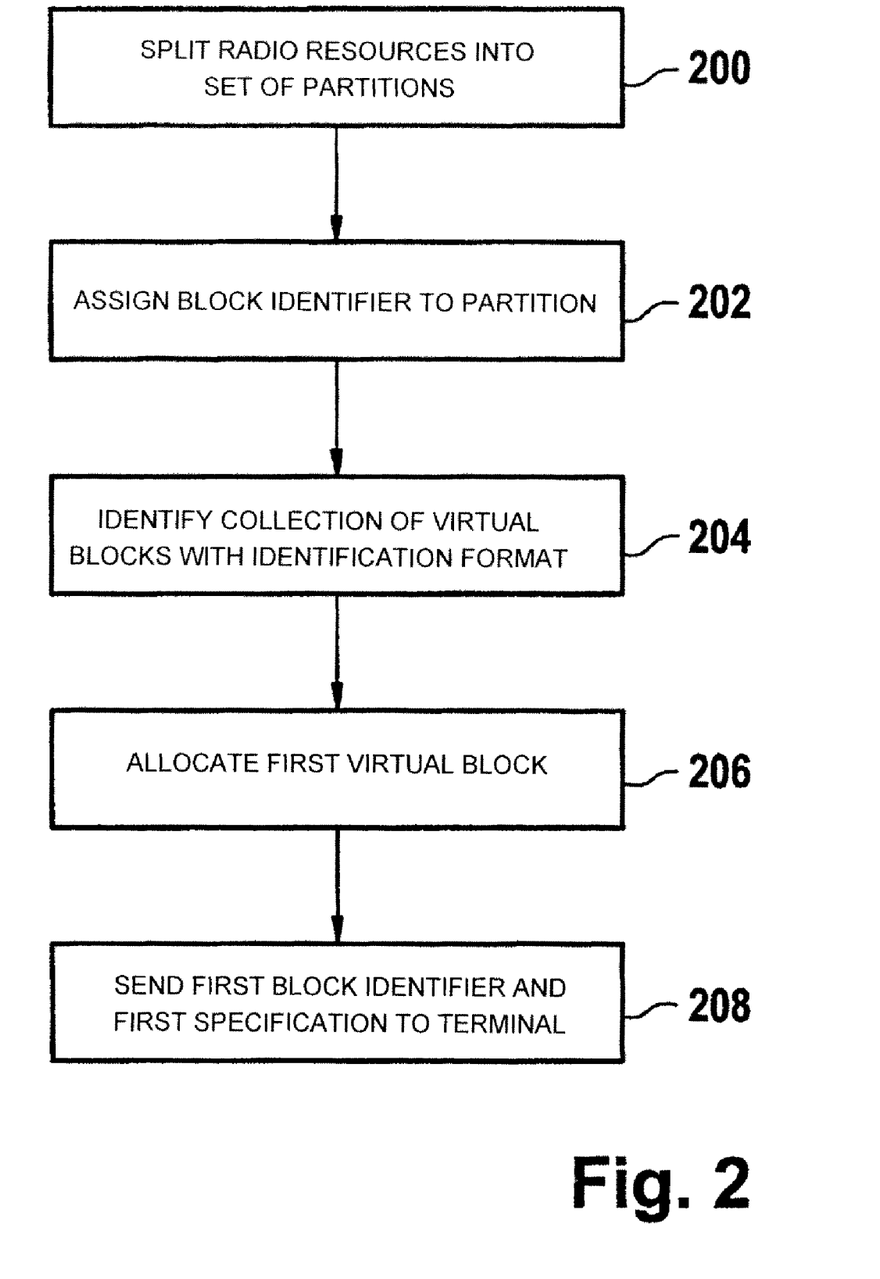
FIG. 2 shows a flow diagram illustrating steps performed by a method in accordance with the invention.

FIG. 2 shows a flow diagram illustrating steps performed by a method of signaling to a mobile terminal the radio resources that will be used in a wireless communication between the mobile terminal and a base station according to the invention.

According to step 200, a plurality of radio resources provided by the base station is split into a set of partitions, wherein each partition comprises a set of virtual blocks, and wherein each virtual block of the set of virtual blocks is exclusively mapped to one or more radio resources of the plurality of radio resources.

According to step 202, a block identifier is assigned to each partition of the set of partitions and according to step 204, an identification format according to which a collection of one or more virtual blocks of the set of virtual blocks of a partition is identifiable is employed. Then, according to step 206, at least a first virtual block of a first partition of the set of partitions is allocated for communication between the mobile terminal and the base station. The first partition is associated with a first block identifier and the at least first virtual block is identifiable by a first specification according to the identification format. According to step 208, the first block identifier and the first specification are sent to the mobile terminal.

Figure 3:
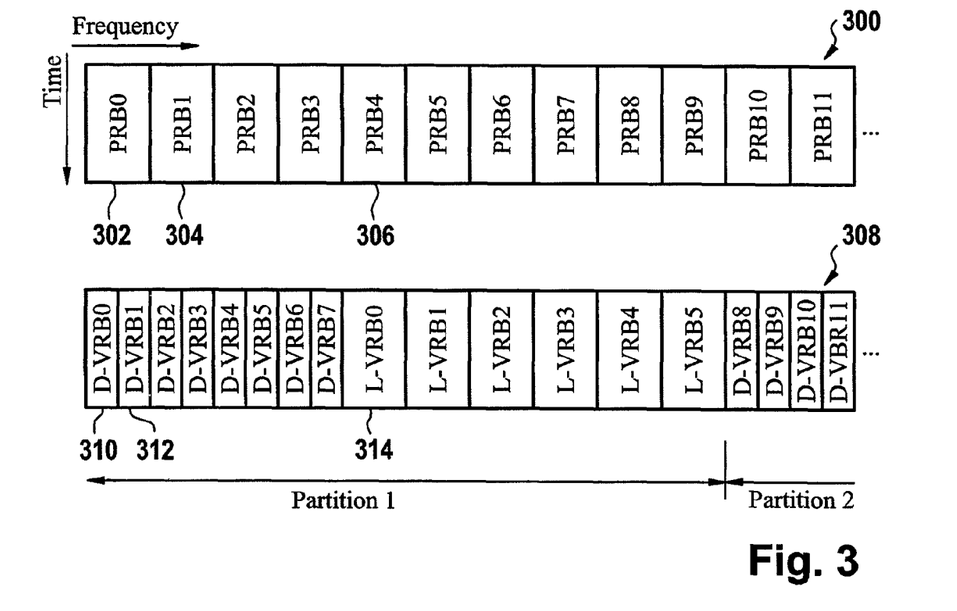
FIG. 3 illustrates how radio resources of a plurality of radio resources are split into various partitions and virtual blocks.

FIG. 3 illustrates how radio resources of a plurality of radio resources are split into various partitions and virtual blocks. A set of physical resource blocks 300 that is provided by a base station and that might relate to a set of sub-band carriers of an OFDM spectrum is grouped into several physical resource blocks 302, 304, 306, and so on. The resource block are indicated in FIG. 3 by PRB 0, PRB 1, . . . , PRB 11.

The set of physical blocks 300 is further assigned to a set of virtual resource blocks 308. The set of virtual blocks 308 is further divided into a set of distributed virtual resource blocks (D-VBRs) and localized virtual resource blocks (L-VBRs). In FIG. 3, the D-VRBs are indicated by D-VRB 0 to 11 and the L-VRBs are indicated by L-VRB 0 to L-VRB 5. According to this example, a physical resource block is associated with two D-VRBs or with one L-VRB. For example, the resource block 302 (PRB 0) is associated with D-VRB 310 (D-VRB 0) and D-VRB 312 (D-VRB 1), whereas resource block 306 (PRB 4) is associated with L-VRB 314 (L-VRB 0).

Furthermore, the set of virtual resource blocks 308 is divided into equally spaced partitions 1, 2, and so one. It should be mentioned that the block sizes of the D-VRBs might not be fixed. Instead, their sizes might be adaptable. For example, the D-VRBs 310 and 312 might be merged into one D-VRB whenever appropriate.

For communication with a mobile terminal, the scheduler associated with the corresponding base station might allocate for one or more time transmission interval (TTI) D-VRBs and/or L-VRBs of one or more partition for the mobile terminal. In this way, different TTIs may be composed of pure D-VRBs or of pure L-VRBs or of a combination thereof.

Figure 4:
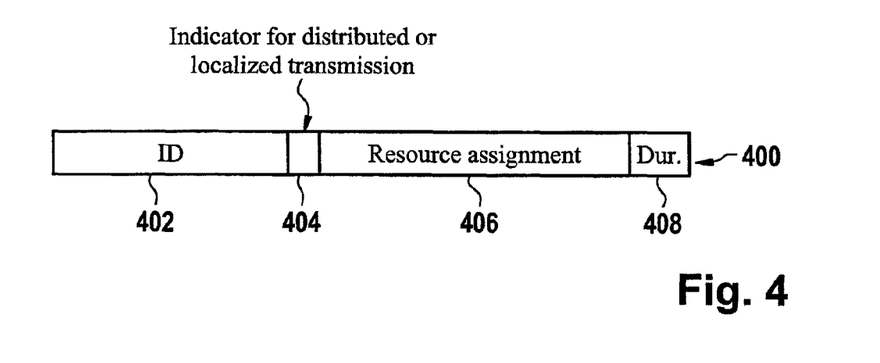
FIG. 4 shows a block diagram of a signaling message.

FIG. 4 shows a block diagram of a signaling message 400. The signaling message 400 comprises an ID 402 that relates to the receiving mobile terminal. The mobile terminal is therefore able to identify itself as addressee of the message 400. Furthermore, the message comprises an indicator 404 which is used to indicate distributed or localized transmission and/or the indentification format.

In particular, the indicator is therefore used to indicate whether the allocated resources consist of pure D-VRBs or of pure L-VRBs. The indicator 404 might also be employed to indicate which identification format is employed. Thus, whether direct signaling, bitmap signaling or tree based signaling or something else is employed. The selection whether direct signaling, bitmap signaling, or tree based signaling is employed could be done by use of an algorithm which selects the way of signaling so that the lowest signaling overhead is required.

The signaling message comprises a resource assignment indicator 406 that relates to the first block identifier and the specification according to FIG. 1. Thus, the resource assignment indicator 406 is employed to signal the identifier and specification of the partition and resource blocks that are allocated for the mobile terminal. The message 400 further comprises a time indication 408 which indicates for how many TTIs the allocated virtual blocks will be employed with respect to the receiving mobile terminal.

Figure 5:
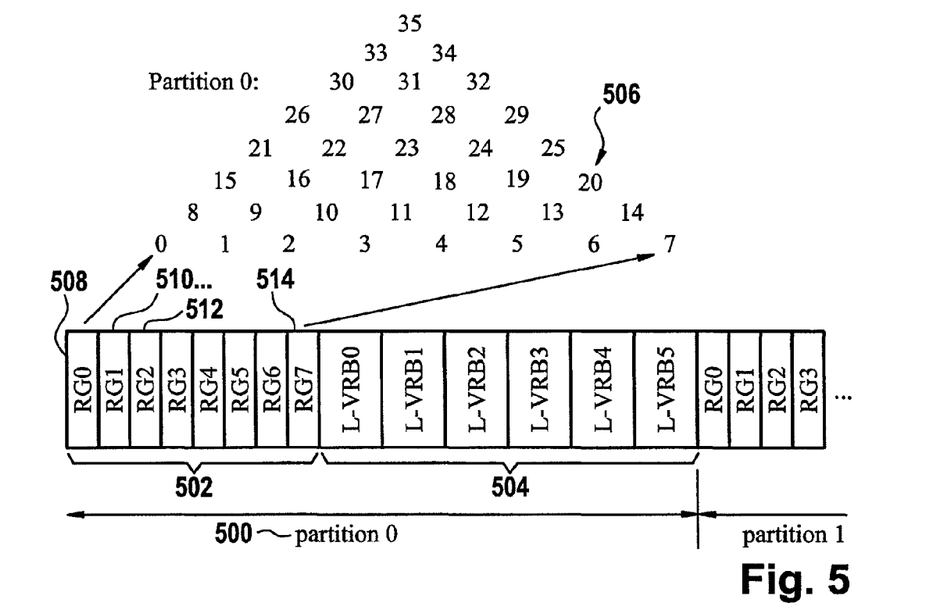
FIG. 5 illustrates how the identification format is used to identify virtual blocks by use of a tree approach, FIG. 6 provides a further illustration how the identification format is used to identify virtual blocks by use of a tree approach, FIG. 7 provides a further illustration how the identification format is used to identify virtual blocks by use of a tree approach, FIG. 8 provides yet another illustration how the identification format is used to identify virtual blocks by use of a tree approach, and FIG. 9 provides a further illustration how the identification format is used to identify virtual blocks by use of a tree approach.

FIG. 5 illustrates how the identification format is used to identify virtual blocks by use of a tree approach. A partition 500 comprises a set of resource groups (RGs) 502 and a set of L-VRBs 504. The physical resource blocks (PRBs) consisting of one or more radio resources, e.g. sub-carriers, are mapped to the LVRs or DVRBs. A RG comprises equidistantly spaced DVRBs. For example, the RG0 comprises D-VRB0 and D-VRB8, the RG1 comprises D-VRB1 and D-VRB9 (cf. FIG. 3). Each RG thus comprises a D-VRB of each partition.

The identification format provides a tree structure 506 that is defined for each partition. The bottom line of the tree structure 506 comprises the numbers in the range between 0 and 7 so that a number can be assigned in a one-to-one relationship to a RG of the set of RGs 502. For example, RG 508 (RG0 in partition 500) is associated with the number 0, RG 510 is associated with number 1, RG 512 is associated with number 2, and RG 7 512 is associated with number 7. Note that RG 508 relates only to the radio resources mapped to RG0 and that are located in the partition 500. Thus, RG 508 corresponds indeed to D-VRB0 310 of FIG. 3. In order to signal to a mobile terminal that RG0 of partition 500 has been allocated for communication with the mobile terminal, it is sufficient to signal the number assigned according to the tree structure 506 to RG0 and the block identifier for the partition 500.

If instead only the number "0" is signaled without the block identifier, then it is indicated that the complete RG0 has been allocated for the mobile terminal. It is appreciated by the skilled person that the tree structure along with block identifiers for each partition allow for a large variety of possibilities to specify the RGs allocated for a mobile terminal.

For example, when the RGs 508-512 are allocated for the mobile terminal, then it is sufficient to signal the number '15' of the third bottom row of the tree structure 506 along with the block identifier of the partition 500 to the mobile terminal. Thus, the method is particularly advantageous as only by use of two short number, the allocated RGs can be signaled to the mobile terminal. If the number '15' is signaled without block identifier, then the allocation of all the RG0, RG1, and RG2 of all partitions is signaled.

The identification format could alternatively specify that, when for example the number 15 is signaled, only the RGs 508 and 512, the RGs at the edge of the "tree" ending at the number 15 are allocated for the mobile terminal.

Figure 6:
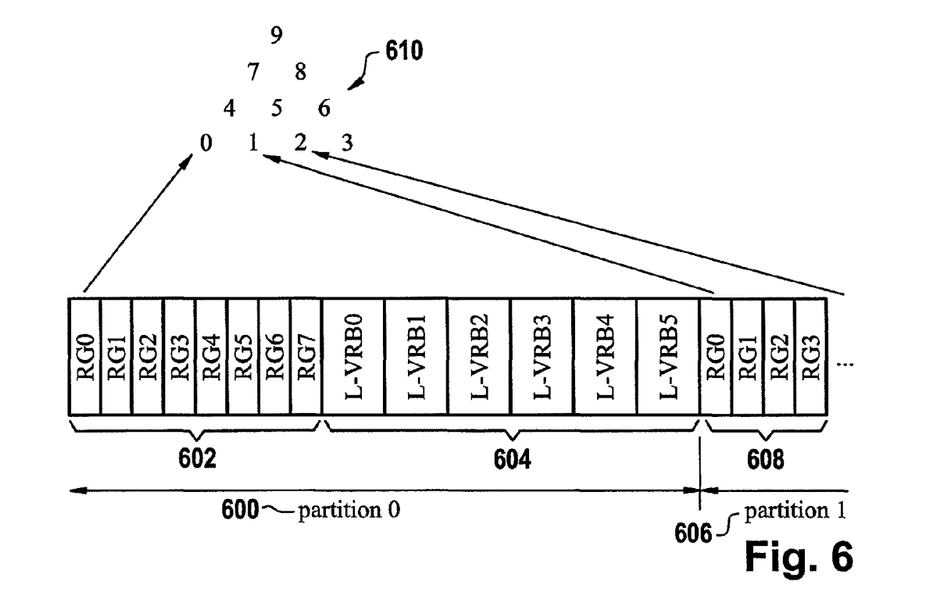

FIG. 6 provides a further illustration how the identification format is used to identify virtual blocks by use of a tree approach. It is assumed that the plurality of radio resources has been split in four partitions, wherein a first partition 600 and a second partition 606 are shown in FIG. 6. The first partition 600 has a set of resource groups (RGs) 602 and a set of L-VRBs 604. The second partition 606 comprises a set of RGs 608. The set of RGs 602 and the set of RGs 608 both comprise RG0 to RG7, but RG0 of the set of RGs 602 relates to different physical resources that RG0 of the set of RGs 608.

The identification format provides a tree structure 610. A number of the lowest row of the tree structure 610 is assigned to one RG of each set of RGs. Thus, the number 0 is assigned to D-VRB0 of RG0 (cf. with FIG. 3), the number 1 is assigned to D-VRB8 of RG 0.

If the number 9 according to the tree structure 610 is signaled to a mobile terminal, then it is indicated to the mobile terminal that the complete RG 0 of all four partitions has been allocated for the mobile terminal. If the number 4 is signaled, then according to the tree structure 610, it is indicated that only D-VRB0 and DVRB8 of RG0 (the part of the RG0 in the first partition 600 and the second partition 606) have been allocated for the terminal.

Figure 7:
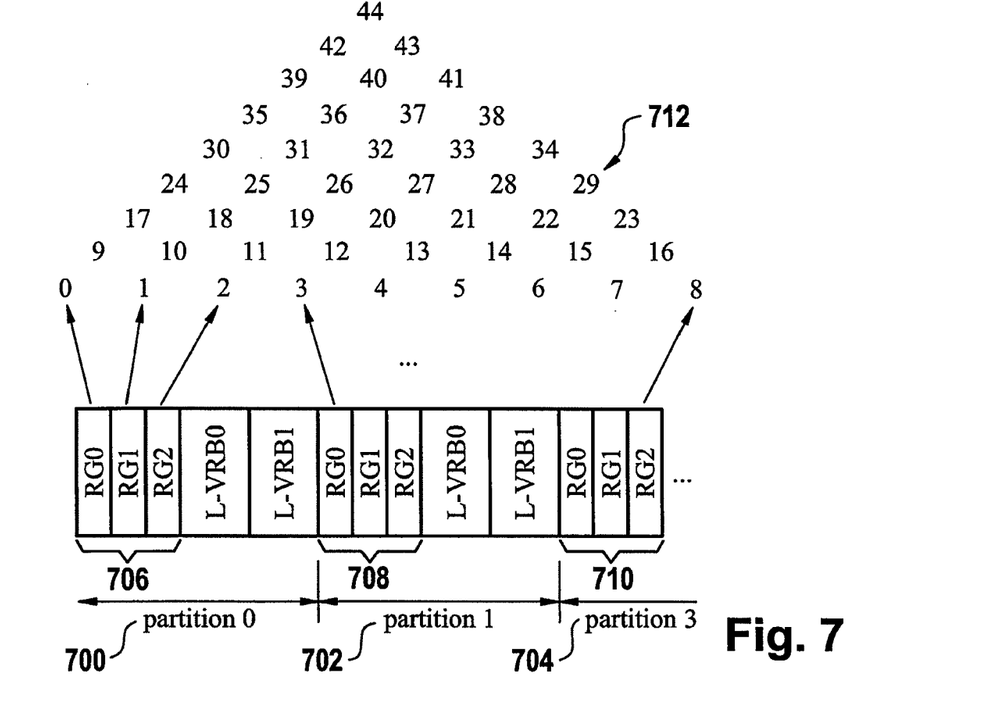

FIG. 7 provides a further illustration how the identification format is used to identify virtual blocks by use of a tree approach. The plurality of radio resources is split into a set of partitions comprising a first partition 700, a second partition 702, and a third partition 704. The first partition 700 comprises a set of RGs 706, the second partition 702 comprises a set of RGs 708, and the third partition 704 comprises a set of RGs 710. In particular, the set of RGs 706 comprises the D-VRBs of the RG0, RG1, and RG2 that lie in the first partition 700. The set of RGs 708 comprises the D-VRBs of the RG0, RG1, and RG2 that lie in the second partition 702. The set of RGs 710 comprises the D-VRBs of the RG0, RG1, and RG2 that lie in the third partition 704.

A tree structure 712 provides in its bottom line a set of numbers such that a number can be assigned to each D-VRB of a RG of the set of RGs 706, 708, 710, and so on.

Thus, when only DVRBs are allocated for a mobile terminal and a tree approach according to the tree structure 712 is employed, it is sufficient to signal the numbers assigned to the allocated D-VRBs to the mobile terminal.

Moreover, it is also possible by signaling a single number to indicate that a plurality of D-VRBs has been allocated for the mobile terminal. For example, when the number 17 is signaled, then it is indicated that according to the tree structure 712 the D-VRBs of the set of resource groups 706 have been allocated for the mobile terminal.

Figure 8:
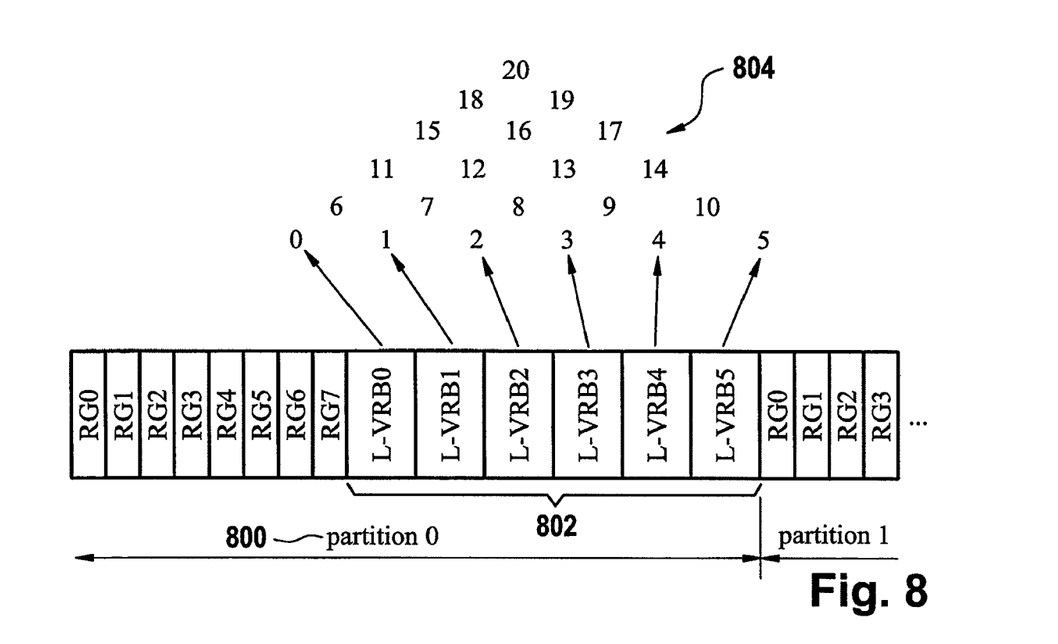

FIG. 8 provides yet another illustration how the identification format is used to identify virtual blocks by use of a tree approach. The plurality of radio resources provided by a base station is split into a set of partitions comprising a first partition 800. The first partition 800 has a set of L-VRBs 802. A tree structure 804 provides in its lowest row a set of numbers assigned in a one-to-one relationship to each L-VRB of the set of L-VRBs. In order to signal that a L-VRB of the set of L-VRBs has been allocated to a mobile terminal, the base station might sent the number assigned to the L-VRB according to the tree structure 804 to the mobile terminal. Furthermore, numbers in higher rows of the tree structure 804 can be used to signal that a plurality of L-VRBs has been allocated for the mobile terminal. For example, when the number 13 along with the block identifier for the partition 800 is sent to the mobile terminal, then it is indicated that L-VRB2, L-VRB3, and L-VRB4 of partition 800 are allocated for the terminal.

Figure 9:
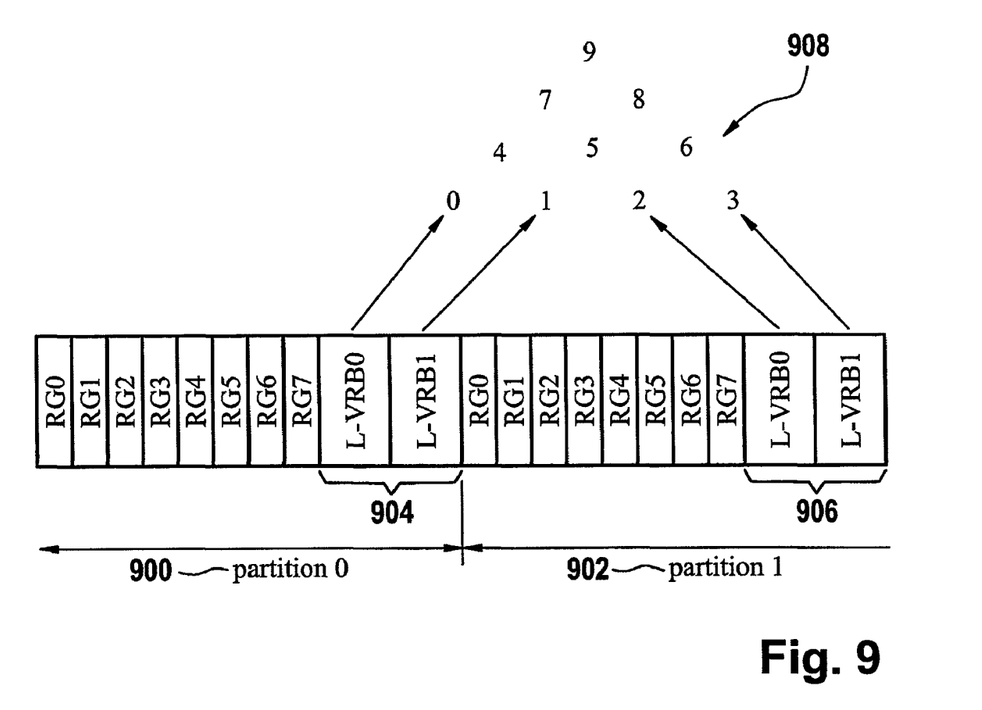

FIG. 9 provides a further illustration how the identification format is used to identify virtual blocks by use of a tree approach. The plurality of radio resources provided by a base station is split into a set of partitions comprising a first partition 900 and a second partition 902. The first partition 900 has a first set of L-VRBs 904 and the second partition 902 has a second set of L-VRBs 906.

A tree structure 908 provides in its lowest row a set of numbers assigned in a one-to-one relationship to each L-VRB of the first and second set of L-VRBs 904, 906. In order to signal which L-VRBs of the two sets of L-VRBs 904, 906 have been allocated to a mobile terminal, the base station might sent the numbers assigned to the L-VRBs according to the tree structure 908 to the mobile terminal.

Furthermore, numbers in higher rows of the tree structure 908 can be used to signal that a plurality of L-VRBs have been allocated for the mobile terminal. For example, when the number 5 is sent to the mobile terminal, then it is indicated that L-VRB1 of the first partition 900 and L-VRB0 of the second partition 902 are allocated for the terminal.

LIST OF REFERENCE NUMERALS

100 Communication network
102 Base station
104 Mobile terminal
106 Microprocessor
108 Storage
110 Antenna
112 Microprocessor
114 Storage
116 Computer program product
118 Scheduler
120 Computer program product
122 Plurality of radio resources
124 First partition
126 Second partition
128 Virtual block
130 Virtual block
132 Virtual block
134 Virtual block
136 Virtual block
138 Virtual block
140 Block identifier
142 Block identifier
144 Identification format
146 Specification
148 First block identifier
150 Message
300 Set of physical resources
302 Resource block
304 Resource block
306 Resource block
308 Set of virtual resources
310 Distributed virtual resource block
312 Distributed virtual resource block
314 Localized virtual resource block
400 Signaling message
402 Identifier
404 Indicator
406 Resource assignment identifier
408 Timing indicator
500 Partition
502 Set of resource groups
504 Set of L-VRBs
506 Tree structure
508 Resource group
510 Resource group
512 Resource group
514 Resource group
600 First partition
602 Set of resource groups
604 Set of L-VRBS
606 Second partition
608 Set of resource groups
610 Tree structure
700 First partition
702 Second partition
704 Third partition
706 Set of resource groups
708 Set of resource groups
710 Set of resource groups
712 Tree structure
800 First partition
802 Set of L-VRBs
804 Tree structure
900 First partition
902 Second partition 904 First set of L-VRBs
906 Second set of L-VRBs
908 Tree structure

The invention claimed is:

1. A method of signaling to a mobile terminal radio resources that will be used in a wireless communication between the mobile terminal and a base station, wherein the base station provides a plurality of radio resources, the method comprising:
   splitting the plurality of radio resources into a set of partitions, wherein each partition of the set of partitions comprises a set of virtual blocks, wherein each virtual block of the set of virtual blocks is exclusively mapped to one or more radio resources of the plurality of radio resources, wherein a set of physical resource blocks is assigned to the set of virtual blocks;
   using an identification format according to which a collection of one or more virtual blocks of the set of virtual blocks is identifiable;
   allocating at least a first virtual block for communication between the mobile terminal and the base station, the at least first virtual block being identifiable by a first specification according to the identification format; and
   sending the first specification to the mobile terminal;
   wherein a block identifier is assigned to each partition of the set of partitions, wherein the at least first virtual block is comprised in a first partition, wherein the first partition is associated with a first block identifier, wherein the first block identifier is further sent to the mobile terminal.

2. The method of claim 1, further comprising sending a timing indication, the timing indication specifying for how many time transmission intervals the first partition and the at least first virtual block will be employed for communication with the mobile terminal.

3. A non-transitory computer program product for signaling radio resources to a mobile terminal that will be used in a wireless communication between the mobile terminal and a base station, wherein the base station provides a plurality of radio resources, the computer program product comprising a computer usable medium including a computer readable program, wherein the computer readable program is executed via a processor comprising a memory whereon computer-executable instructions comprising the program are stored and when executed on a computer causes the computer to:
   split the plurality of radio resources into a set of partitions, wherein each partition of the set of partitions comprises a set of virtual blocks, each virtual block of the set of virtual blocks is exclusively mapped to one or more radio resources of the plurality of radio resources wherein a set of physical resource blocks is assigned to the set of virtual blocks;
   use an identification format according to which a collection of one or more virtual blocks of the set of virtual blocks is identifiable;
   allocate at least a first virtual block for communication between the mobile terminal and the base station, the at least first virtual block being identifiable by a first specification according to the identification format; and
   send first block identifier the first specification to the mobile terminal;
   wherein a block identifier is assigned to each partition of the set of partitions, wherein the at least first virtual block is comprised in a first partition, wherein the first partition is associated with a first block identifier, wherein the first block identifier is further sent to the mobile terminal.

4. A communication network component comprising:
   a computer program product for that splits a plurality of radio resources of a base station into a set of partitions, wherein each partition of the set of partitions comprises a set of two or more virtual blocks each virtual block of the set of virtual blocks is exclusively mapped to one or more radio resources of the plurality of radio resources;
   an indicator that indicates an identification format according to which a collection of one or more virtual blocks of the set of virtual blocks is identifiable;
   a scheduler that allocates at least a first virtual block for communication between a mobile terminal and the base station serving the mobile terminal, the at least first virtual block being identifiable by a first specification according to the identification format; and
   an antenna that sends the first specification to the mobile terminal;
   wherein a block identifier is assigned by the computer program product to each partition of the set of partitions, wherein the at least first virtual block is comprised in a first partition, wherein the first partition is associated with a first block identifier, and the first block identifier is further sent to the mobile terminal by the antenna.

5. The communication network component of claim 4, further including a resource assignment indicator that signals a mobile terminal of the first block identifier and the first specification that relate to the partition and resource blocks allocated thereto.

\* \* \* \* \*